US012783656B1

(12) United States Patent
Nemtsov et al.

(10) Patent No.: US 12,783,656 B1
(45) Date of Patent: Nov. 3, 2026

(54) SYSTEM AND METHOD FOR DISCOVERY OF SOFTWARE APPLICATIONS UTILIZING STATIC AND RUNTIME DATA

(71) Applicant: Wiz, Inc., New York, NY (US)

(72) Inventors: Arik Nemtsov, Tenafly, NJ (US); Yonatan Goldschmidt, Kfar Sava (IL); Daniel Shaulov, Prague (CZ)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/635,084

(22) Filed: Mar. 31, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | | |
|---|---|---|---|---|
| 9,563,536 | B1 | 2/2017 | Cooper et al. | |
| 9,990,273 | B2 | 6/2018 | Llangovan et al. | |
| 11,870,796 | B2 | 1/2024 | Bertiger et al. | |
| 12,095,796 | B1 * | 9/2024 | Godefroid | G06F 9/542 |
| 12,189,774 | B1 | 1/2025 | Luttwak et al. | |
| 12,212,586 | B2 | 1/2025 | Shemesh et al. | |
| 12,452,293 | B1 | 10/2025 | Lidgi et al. | |
| 12,495,052 | B1 * | 12/2025 | Godefroid | G06F 16/9024 |
| 12,531,881 | B2 | 1/2026 | Gilad et al. | |
| 12,596,813 | B2 | 4/2026 | Rajaretnam et al. | |
| 2014/0123280 | A1 | 5/2014 | Kedma et al. | |
| 2018/0314411 | A1 | 11/2018 | Vora | |
| 2020/0112544 | A1 | 4/2020 | Smith | |
| 2022/0156383 | A1 * | 5/2022 | Schwarzbauer | G06F 21/54 |
| 2023/0342078 | A1 | 10/2023 | Thomas et al. | |
| 2024/0089272 | A1 | 3/2024 | Gilad et al. | |
| 2024/0303172 | A1 * | 9/2024 | Larkin | G06F 11/302 |
| 2024/0330434 | A1 * | 10/2024 | Strogov | G06F 21/52 |
| 2025/0030741 | A1 * | 1/2025 | Trifilo | H04L 63/0236 |

OTHER PUBLICATIONS

Islam et al., "Anomaly Detection in Large-Scale Cloud Systems: An Industry Case and Dataset", 2025, arXiv, 12 pages. (Year: 2025 ).
Mitchell et al., "On the Automatic Identification of Misconfiguration Errors in Cloud Native Systems", 2024, ACM, pp. 539-548. (Year: 2024).

* cited by examiner

*Primary Examiner* — J. Brant Murphy
(74) *Attorney, Agent, or Firm* — M&B IP Analysts, LLC

(57) ABSTRACT

A system and method for discovering application components and processes for application detection and response is presented. The method includes deploying a runtime sensor on a resource, the resource deployed in a cloud computing environment; configuring the runtime sensor to detect a plurality of processes executed in real time on the resource; associating the plurality of processes with a single application installed on the resource based on a user space stack trace; configuring the runtime sensor to detect a cybersecurity event based on an action performed by a process of the plurality of processes; receiving a detection from the runtime sensor indicating the cybersecurity event; and initiating a mitigation action based on the received detection.

19 Claims, 9 Drawing Sheets

SYSTEM AND METHOD FOR DISCOVERY OF SOFTWARE APPLICATIONS UTILIZING STATIC AND RUNTIME DATA

TECHNICAL FIELD

The present disclosure relates generally to the detection of cybersecurity threats, and specifically to complementary solutions for discovering software applications utilizing static analysis and runtime data.

BACKGROUND

Cloud computing environments host software applications deployed on resources such as virtual machines, software containers, serverless functions, a combination thereof and the like. In many deployments, a single software application executes as a plurality of cooperating processes that access files, directories, software libraries, and network endpoints. Approaches that rely on static information, such as installed packages, container image manifests, declared dependencies, configuration templates, fail to reflect runtime behavior, including dynamic library loading, conditional execution of helper binaries, indirect file path access, and runtime network activity. As a result, such approaches often fail to discover which components the software application actually uses when the software application is composed of multiple processes.

Cloud computing environments also generate high volumes of runtime events. Converting such runtime events into detections frequently produces excessive detection noise. Techniques that reduce noise by batching detections introduce a delay that is undesirable for response actions.

It would therefore be advantageous to provide a solution that overcomes the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions.

In one general aspect, the method may include deploying a runtime sensor on a resource, the resource deployed in a cloud computing environment. The method may also include configuring the runtime sensor to detect a plurality of processes executed in real time on the resource; associating the plurality of processes with a single application installed on the resource based on an user space stack trace; configuring the runtime sensor to detect a cybersecurity event based on an action performed by a process of the plurality of processes; receiving a detection from the runtime sensor indicating the cybersecurity event; initiating a mitigation action based on the received detection. Other embodiments of this aspect include corresponding computer systems, apparatus, and computer programs recorded on one or more computer storage devices, each configured to perform the actions of the methods.

Implementations may include one or more of the following features. The method may include monitoring a data link layer communication through an extended Berkeley Packet Filter (eBPF) interface; and detecting the plurality of processes based on the monitoring; statically inspecting an inspectable disk associated with the resource; and identifying the single application based on the static inspection; statically inspecting the single application; and generating a plurality of functionality records based on a static inspection of the single application.

The method where each functionality record among the plurality of functionality records includes a first action identifier and a target identifier field, may include identifying a second action identifier included in a runtime event; comparing the first action identifier with the second action identifier; matching a runtime event to a functionality record among the plurality of functionality records based on the comparison; and determining a process among the plurality of processes corresponds to the single application based on the matched runtime event; converting the action identifier and the target identifier field of the plurality of functionality records into a set of baseline features; and generating a behavior baseline for the single application based on the set of baseline features; generating an instruction identifying a process identifier associated with the received detection; and transmitting the instruction to the runtime sensor to terminate a process corresponding to the process identifier; capturing the user space stack trace associated with the action performed by the process, the user space stack trace including a plurality of frame identifiers; obtaining a memory snapshot of an address space associated with the process; parsing the memory snapshot to obtain symbol data; resolving the plurality of frame identifiers based on the symbol data; and generating a symbolized stack trace record including a plurality of symbol identifiers based on the resolved plurality of frame identifiers; applying a rule to the action and to one or more symbol identifiers among the plurality of symbol identifiers, where detecting the cybersecurity event further includes the applied rule. Implementations of the described techniques may include hardware, a method or process, or a computer tangible medium.

In one general aspect, non-transitory computer-readable medium may include one or more instructions that, when executed by one or more processing circuitries of a device, cause the device to deploy a runtime sensor on a resource, the resource deployed in a cloud computing environment; configure the runtime sensor to detect a plurality of processes executed in real time on the resource; associate the plurality of processes with a single application installed on the resource based on an user space stack trace; configure the runtime sensor to detect a cybersecurity event based on an action performed by a process of the plurality of processes; receive a detection from the runtime sensor indicating the cybersecurity event; initiate a mitigation action based on the received detection. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to deploy a runtime sensor on a resource, the resource deployed in a cloud computing environment; configure the runtime sensor to detect a plurality of processes executed in real time on the resource; associate the plurality of processes with a single application installed on the resource based on an user space stack trace; configure the runtime sensor to detect a cybersecurity event based on an action performed by a process of the plurality of processes; receive a detection from the runtime sensor indicating the cybersecurity event; a mitigation action based on the received detection. Other embodiments of this aspect include corresponding computer systems, apparatus, and computer programs recorded on one or more computer storage devices, each configured to perform the actions of the methods.

Implementations may include one or more of the following features. The system where the memory contains further instructions which, when executed by the processing circuitry, further configure the system to monitor a data link layer communication through an extended Berkeley Packet Filter (eBPF) interface, and detect the plurality of processes based on the monitoring.

The system where the memory contains further instructions which, when executed by the processing circuitry, further configure the system to statically inspect an inspectable disk associated with the resource, and identify the single application based on the static inspection.

The system where the memory contains further instructions which, when executed by the processing circuitry, further configure the system to statically inspect the single application, and generate a plurality of functionality records based on a static inspection of the single application.

The system where each functionality record among the plurality of functionality records includes a first action identifier and a target identifier field, may include identifying a second action identifier included in a runtime event; comparing the first action identifier with the second action identifier; matching a runtime event to a functionality record among the plurality of functionality records based on the comparison; and determining a process among the plurality of processes corresponds to the single application based on the matched runtime event.

The system where the memory contains further instructions which, when executed by the processing circuitry, further configure the system to convert the action identifier and the target identifier field of the plurality of functionality records into a set of baseline features; and generate a behavior baseline for the single application based on the set of baseline features.

The system where the memory contains further instructions which, when executed by the processing circuitry, further configure the system to generate an instruction identifying a process identifier associated with the received detection, and transmit the instruction to the runtime sensor to terminate a process corresponding to the process identifier.

The system where the memory contains further instructions which, when executed by the processing circuitry, further configure the system to capture the user space stack trace associated with the action performed by the process, the user space stack trace including a plurality of frame identifiers; obtain a memory snapshot of an address space associated with the process; parse the memory snapshot to obtain symbol data; resolve the plurality of frame identifiers based on the symbol data; and generate a symbolized stack trace record including a plurality of symbol identifiers based on the resolved plurality of frame identifiers.

The system where the memory contains further instructions which, when executed by the processing circuitry, further configure the system to apply a rule to the action and to one or more symbol identifiers among the plurality of symbol identifiers, where detecting the cybersecurity event further includes the applied rule. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
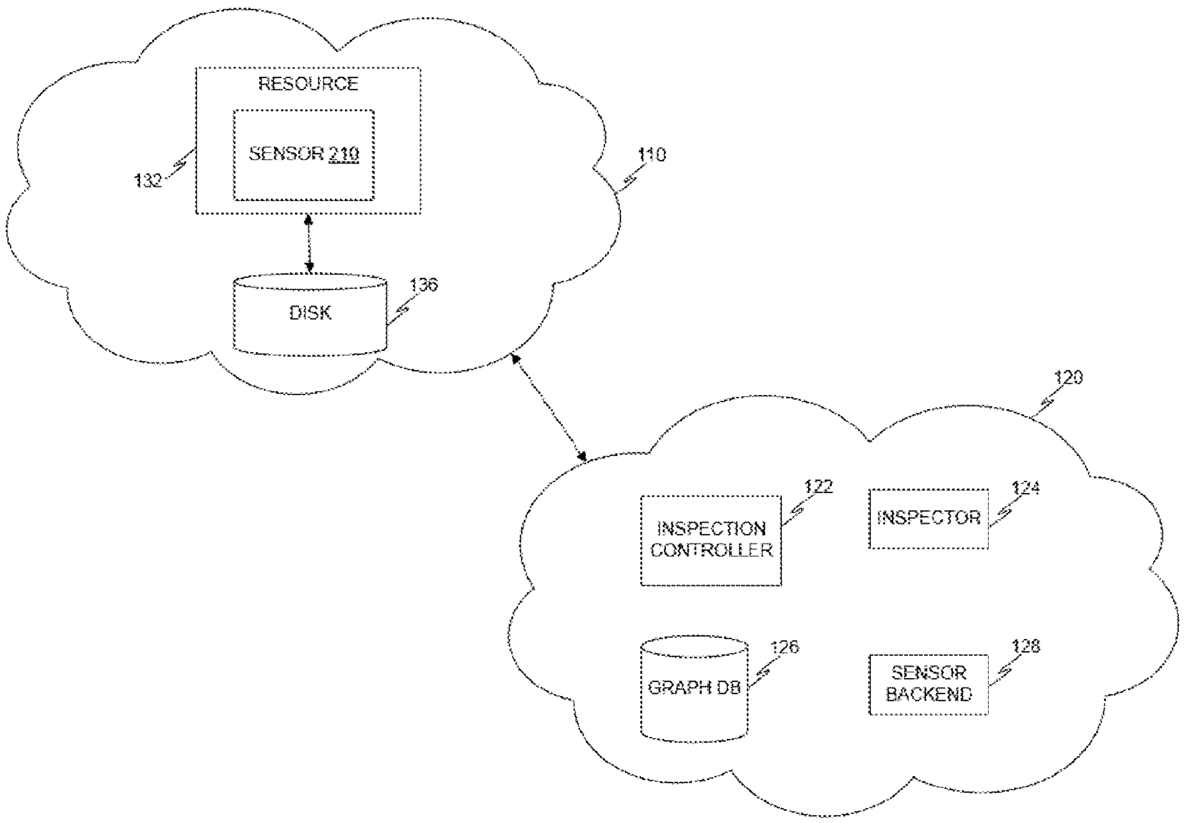
FIG. 1 is a schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a sensor deployed on a workload in a cloud computing environment, to complement detection of cybersecurity threats using static analysis techniques. A sensor is a software package executable on a machine, such as an endpoint machine. An endpoint machine (or simply "endpoint") may be, for example, a proxy, a gateway, a reverse proxy, a webserver, and the like. A sensor is able to deploy on an endpoint utilizing less resources than an agent, as the sensor is configured to retrieve and analyze less data than an agent software is. This is due to the sensor capabilities being complemented by a static analysis solution, such as a cybersecurity threat inspector.

In an embodiment, the sensor is configured to listen to a data link layer. For example, in an embodiment, a sensor is configured to listen for packets utilizing the extended Berkeley Packet Filter (eBPF) interface. In certain embodiments, the sensor is configured to request rules, definitions, and the like, from a sensor backend server. The sensor is configured, for example, to apply a rule from the requested rules, definitions, and the like to an event detected by listening on the eBPF interface of a machine on which the sensor is deployed. In certain embodiments, the sensor is configured to send an event to the sensor backend server, for example, in response to determining that the event matches a predefined definition.

In certain embodiments, the sensor is configured to send an event, for example, based on a predetermined definition, to a sensor backend server, which is configured to store the event on a security graph. The security graph includes a representation of the cloud computing environment in which the endpoint is deployed. For example, the sensor may detect that the endpoint sent a network packet to an IP address which is associated with a known cybersecurity risk, such as a coin mining pool. The sensor is configured to generate a notification to a sensor backend server. In an embodiment, the sensor backend server is configured to generate an instruction for an inspection controller. The inspection controller, in turn, is configured to provision an inspector to inspect the endpoint for the presence of a cryptominer malware.

By performing runtime and static analysis in this manner, the overlap in detection between the sensor and inspector are reduced. Additionally, the sensor is able to initiate inspection by the inspector, which allows efficient prioritizing of inspection resources, thereby reducing time to detection of cybersecurity threats, which also reduces time to respond to cybersecurity threats.

In an embodiment, the sensor backend server 128 is configured to manage an application detection and response workflow based on sensor generated data received from the sensor 210. In an embodiment, managing the application detection and response workflow includes associating runtime activity with a software application deployed on a resource in the cloud computing environment 110, storing a detection record in the graph database 126 as part of the security graph, and initiating a mitigation action responsive to the detection record, a combination thereof and the like.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments, a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity and a resource to other cloud entities. For example, a load balancer is a resource to a user account requesting a webpage from a webserver behind the load balancer, and the load balancer is a principal to the webserver.

The cloud computing environment 110 includes a plurality of resources. While a single resource 132 is depicted for simplicity, it is evident that certain embodiments include the plurality of resources, variations thereof, a combination thereof and the like, without departing from the scope of this disclosure. In some embodiments, the resource 132 includes a virtual machine 112, a software container orchestrator 114, a serverless function 116, a combination thereof and the like (discussed in more detail in FIG. 2).

Each such resource (such as the resource 132) is susceptible to various cybersecurity threats. Such threats can become apparent, for example, due to a software version of an application in a software container 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, the resource 132 includes a sensor 210 configured to a particular resource, resource type, combination thereof, and the like. An example deployment of the sensor 210 is discussed in more detail in FIG. 2 below.

In an embodiment, the sensor 210 is configured to listen for events, packets, and the like, on a data link layer. For example, the sensor 210 is configured to utilize an eBPF interface, which allows non-intrusive monitoring of runtime events, including network activity, file activity, process activity, a combination thereof and the like. In certain embodiments, the sensor 210 is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor 210 is configured to deploy one or more eBPF probes to monitor system-call activity. In an embodiment, the system-call activity includes a network operation, a process start operation, a file operation, a combination thereof and the like. In an embodiment, in response to detecting a system-call event through the eBPF interface, the sensor 210 is configured to capture a user space stack trace associated with a process that invoked the system-call event, the user space stack trace including a plurality of frame identifiers each corresponding to an instruction pointer value in a user space address space of the process. In an embodiment, the user space stack trace represents a stack of user space functions executed in application code that led to the system-call event.

In an embodiment, the sensor 210 is configured to generate a stack trace record based on the user space stack trace, the stack trace record including a process identifier and the plurality of frame identifiers. In an embodiment, the sensor 210 is configured to transmit the stack trace record to the sensor backend server 128 as sensor generated data, the stack trace record corresponding to an event record, the event record representing the system-call event.

In an embodiment, the sensor backend server 128 is configured to receive sensor generated data. For example, the sensor backend server 128 is configured, in an embodiment, to receive events from the sensor 210. In some embodiments, the sensor 210 is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition. A definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource (such as the sensor 210). In an embodiment, initiating inspection of a resource is performed by generating an instruction for an inspection controller 122, the instruction, when executed, configures an inspector 124 to inspect the resource (such as the resource 132).

In an embodiment, the sensor backend server 128 is configured to obtain the stack trace record from the sensor 210 and obtain symbol data associated with the process identifier of the stack trace record. In an embodiment, the symbol data includes a mapping between one or more instruction pointer values and one or more symbol identifiers.

In an embodiment, the sensor backend server 128 is configured to obtain a runtime environment identifier associated with the process identifier of the stack trace record, the runtime environment identifier indicating a Go runtime environment, a Python runtime environment, a Node.js runtime environment, a Ruby runtime environment, a PHP runtime environment, a combination thereof and the like. In an embodiment, the sensor backend server 128 is configured to parse the symbol data based on the runtime environment identifier. In some embodiments, the symbol data is parsed based on the symbol extraction rule set.

In an embodiment, the sensor backend server 128 is configured to resolve the plurality of frame identifiers based on the symbol data to generate a symbolized stack trace record, the symbolized stack trace record including a plurality of symbol identifiers, each symbol identifier including a function identifier, a module identifier, a file identifier, a line identifier, a combination thereof and the like. In certain embodiments, the sensor backend server 128 is configured to generate a partial symbolized stack trace record in response to determining that symbol data is unavailable for a subset of frame identifiers, the partial symbolized stack trace record including the subset of frame identifiers and a module identifier associated with the subset of frame identifiers. In an embodiment, the sensor backend server 128 is configured to store the stack trace record, the symbolized stack trace record, and the partial symbolized stack trace record in the graph database 126 as part of the security graph, and to associate the stack trace record with an event record representing the system-call event.

For example, the sensor 210 is configured to send event data to the sensor backend server 128 in response to detecting that a definition, applied by the sensor 210 to a detected event, results in a "true" value when applied. As an example, the definition may be "is the IP address in the range of 127.0.0.1 through 127.0.0.99", which in this example corresponds to an IP address range used by a malware, such as a cryptominer. When the definition is applied, for example, to a detected network packet, and the result is "true", the sensor 210 is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor 210 is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which, when executed by the inspection controller, generates an inspectable disk, for example, utilizing a snapshot, a copy, a clone, and the like of a disk 136 associated with the resource 132, and provides access to an inspector 124 to the inspectable disk. In some embodiments, the disk 136 includes a boot volume, a data volume, a block storage volume, an attached network volume, a file system image, a combination thereof and the like, the disk 136 storing at least a portion of a software application deployed on the resource 132. In an embodiment, the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor 210 is configured to generate a hash of an application on the resource, such as the virtual machine 112, on which it is deployed, and send the hash to the sensor backend server 128. The received hash may then be compared, for example, by providing it to the inspector 124, with known hash values which correspond to malware applications.

While the examples above discuss malware and cryptominers, it is readily apparent that the sensor and inspector 124 may be utilized to detect other types of cybersecurity threats, such as an exposure, a vulnerability, a weak password, an exposed password, a misconfiguration, and the like.

In certain embodiments, the inspection environment 120 further includes a graph database 126, on which a security is stored. In an embodiment, the security graph is configured to store a representation of a cloud computing environment, such as cloud computing environment 110. For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource (such as the sensor 210) in the cloud computing environment may be stored in the graph database as part of the security graph. In the example above, in response to receiving data from the sensor which indicates a potential malware infection of the virtual machine 112, the sensor backend server 128 is configured, in an embodiment, to: generate a node representing the malware in the security graph, generate a node in the security graph representing the virtual machine 112, and connect the node representing the malware with the node representing the virtual machine 112.

Figure 2:
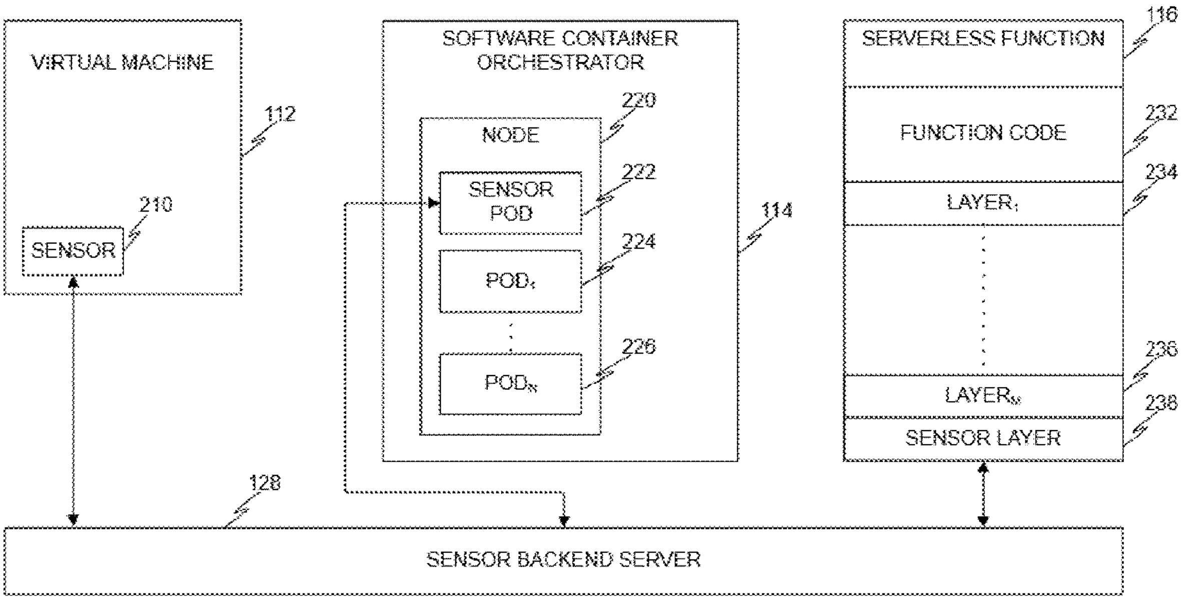
FIG. 2 is a schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads associated with a resource, implemented in accordance with an embodiment. In some embodiments, the resource includes the virtual machine 112, the software container orchestrator 114, the serverless function 116, a combination thereof and the like. The virtual machine 112 may be deployed, for example, utilizing Oracle® VirtualBox®. A software container orchestrator 114 may be deployed, for example, utilizing a Docker® engine, a Kubernetes® engine, and the like. In an embodiment, the software container orchestrator 114 is configured to deploy a software cluster, each cluster including a plurality of nodes. In an embodiment, a node includes a plurality of pods. The serverless function 116 may be, for example, utilized with Amazon® Lambda. In an embodiment, the serverless function 116 is a serverless function container image. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes the sensor 210. In an embodiment, the sensor 210 is deployed as a service executed on the virtual machine 112. In some embodiments, a virtual machine 112 is configured to request binary code, a software package, and the like, for example, from a sensor backend server 128, which, when executed by the virtual machine 112 cause a sensor 210 to run as a service on the virtual machine 112. The sensor 210 is configured to listen to the data link layer communication, for example, through an eBPF interface.

A container cluster 114 runs a daemonset and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to the data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda, a layer contains, in an embodiment, code, content, a combination thereof, and the like. In some embodiments, a layer, such as code layer 234, includes runtime data, configuration data, software libraries, and the like.

In certain embodiments, the serverless function 116 includes a sensor layer 238. The sensor layer 238 is configured, in an embodiment, to listen to the data link layer communication of the serverless function 116, for example through an eBPF interface.

The sensor 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the sensor backend server 128, for example by initiating communication using TCP over the predetermined port.

Figure 3:
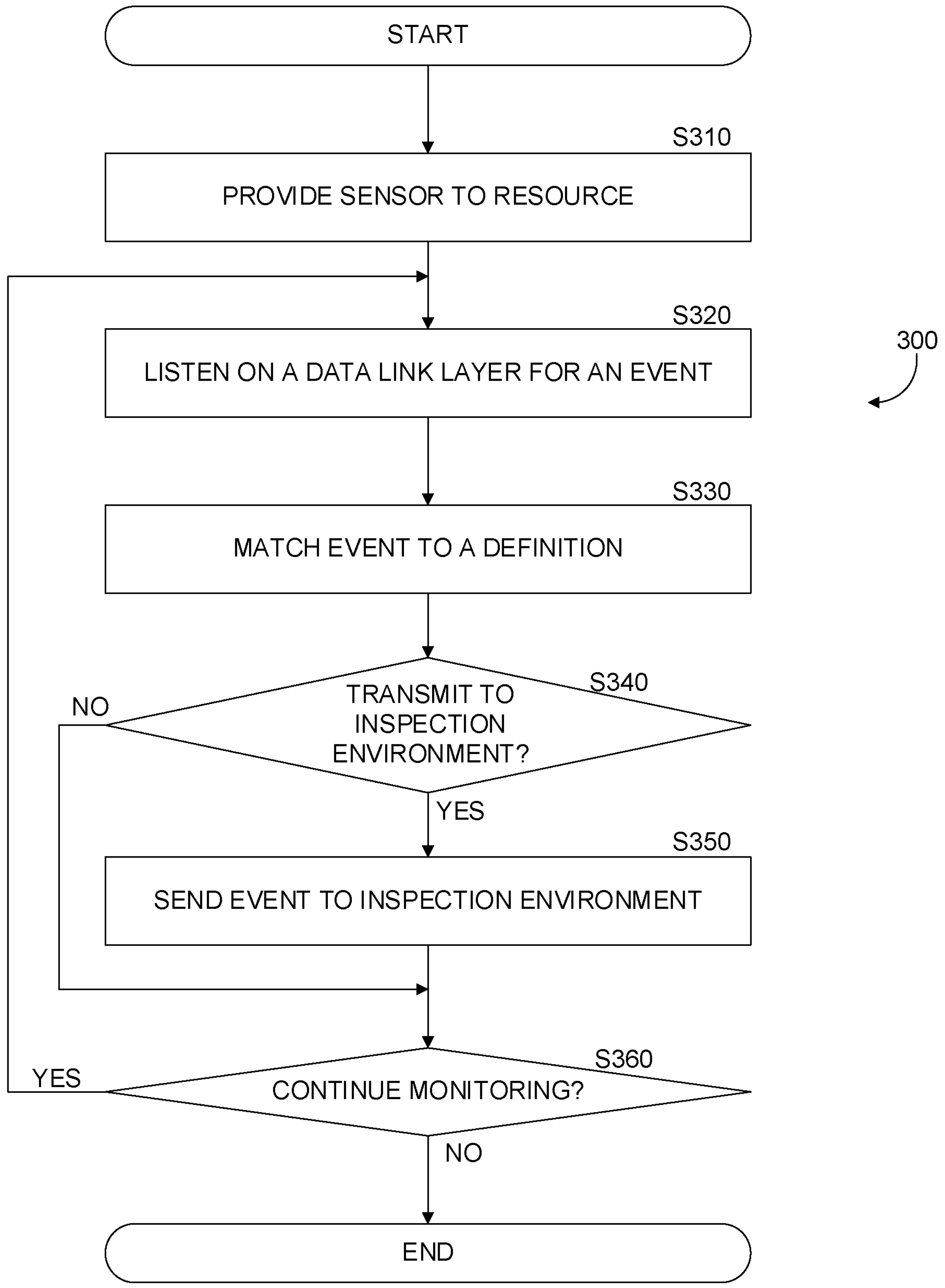
FIG. 3 is a flowchart of a method for performing cybersecurity threat detection on a resource in a cloud computing environment, implemented in accordance with an embodiment.

FIG. 3 is an example flowchart 300 of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
  exe_name: "/usr/sbin/rpc.mountd"
  last_seen: 1663138800
  exe_size: 133664
  exe_sha1: "200f06c12975399a4d7a32e171caabfb994f78b9"
  modules {
    path: "/usr/lib/libresolv-2.32.so"
    last_seen: 1663138800
  }
  modules {
    path: "/usr/lib/libpthread-2.32.so"
    last_seen: 1663138800
  }
  modules {
    path: "/usr/lib/ld-2.32.so"
    last_seen: 1663138800
  }
  modules {
    path: "/usr/lib/libc-2.32.so"
    last_seen: 1663138800
  }
  modules {
    path: "/usr/lib/libtirpc.so.3.0.0"
    last_seen: 1663138800
  }
  modules {
    path: "/usr/lib/libnss_files-2.32.so"
    last_seen: 1663138800
  }
  modules {
    path: "/usr/sbin/rpc.mountd"
    last_seen: 1663138800
  }
  listening_sockets {
    ip_addr: "0.0.0.0"
    port: 60311
  }
  listening_sockets {
    ip_addr: "0.0.0.0"
    port: 43639
  }
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S320. If 'no', in an embodiment execution terminates. In some embodiments, if 'no', another check is performed at S360, for example after a predetermined period of time has lapsed.

Figure 4:
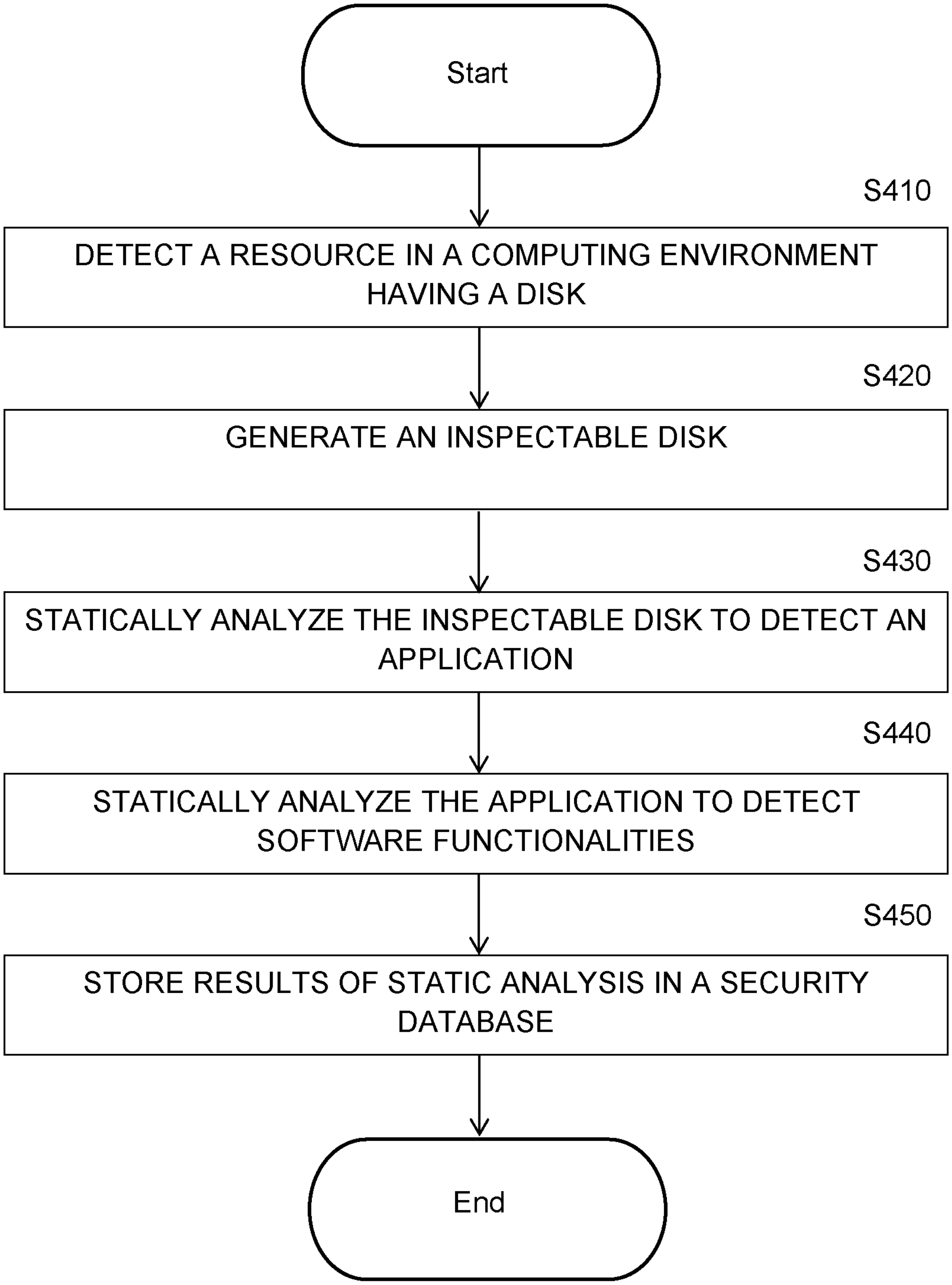
FIG. 4 is a flowchart of a method for preparing static inspection data for a resource deployed in a cloud computing environment, implemented in accordance with an embodiment.

FIG. 4 is an example flowchart of a method for preparing static inspection data for a resource deployed in a cloud computing environment, implemented in accordance with an embodiment.

At S410, a resource is detected in a cloud computing environment, the resource including a disk associated with the resource. In an embodiment, the inspection environment 120 includes the sensor backend server 128, the sensor backend server 128 is configured to receive resource data identifying the resource. For example, the resource data includes a resource identifier, a cloud platform identifier, a disk identifier, a timestamp, a combination thereof and the like. In an embodiment, the sensor backend server 128 is configured to obtain the resource data by receiving a message from a sensor deployed on the resource, by receiving a message from a cloud control plane interface, by querying a security graph stored in the graph database 126, a combination thereof and the like.

At S420, an inspectable disk is generated based on the disk. In an embodiment, generating the inspectable disk is performed by the inspection controller 122, the inspection controller 122 is configured to receive an instruction identifying the disk and an inspection configuration. In an embodiment, the inspection controller 122 is configured to generate the inspectable disk by initiating a snapshot operation for the disk, initiating a copy operation for the disk, initiating a clone operation for the disk, a combination thereof and the like, and by exposing the inspectable disk as a storage object accessible within the inspection environment 120. In an embodiment, the inspection controller 122 is configured to provide access to the inspectable disk by attaching the inspectable disk to a workload in the inspection environment 120, by exposing the inspectable disk through a persistent volume claim (PVC), by mounting the inspectable disk into a file system namespace of a workload, a combination thereof and the like. In some embodiments, the inspection configuration further includes a functionality extraction configuration, the functionality extraction configuration including an action identifier set and a target identifier field set to be extracted into the plurality of functionality records.

At S430, the inspectable disk is statically inspected to detect a software application. In an embodiment, the inspector 124 is configured to access a file system representation of the inspectable disk and to identify an application artifact. For example, the inspector 124 is configured to identify an executable file, a package manifest, an application configuration file, a container image descriptor, a service definition, a combination thereof and the like. In an embodiment, the inspector 124 is configured to detect the software application by parsing directory paths and file metadata on the inspectable disk, by parsing installed package records, by parsing application deployment descriptors, a combination thereof and the like, and by producing an application identifier for the detected software application. In an embodiment, the application identifier includes an application name, a version identifier, a package identifier, a file path identifier, a cryptographic hash value, a combination thereof and the like. In some embodiments, the inspector 124 is configured to select the application artifact based on the application artifact selector included in the inspection configuration, and the inspector 124 is configured to generate the application identifier based on the selected application artifact.

At S440, the software application is statically inspected to detect a plurality of software functionalities. In an embodiment, a software functionality includes an operation implemented by the software application that is representable as a functionality record. In an embodiment, the inspector 124 is configured to generate a plurality of functionality records by parsing the software application on the inspectable disk and extracting a plurality of identifiers and attributes that correspond to operations performed by processes executing the software application in runtime. For example, a functionality record includes an action identifier representing a class of runtime actions attributable to a process identifier, the action identifier including an execute action, an open action, a read action, a write action, a connect action, a bind action, a listen action, a chmod action, a chown action, a setuid action, a mount action, a combination thereof and the like. In an embodiment, the functionality record further includes a target identifier field associated with the action identifier, the target identifier field including a file path access pattern, a directory path access pattern, a socket tuple pattern including an IP address pattern and a port pattern, a library path identifier, a combination thereof and the like. In an embodiment, the inspector 124 is configured to detect the plurality of software functionalities by parsing a configuration file of the software application to extract a network endpoint identifier and a listening port identifier, by parsing an executable header and linked library records to extract a library dependency identifier, by parsing a service definition to extract an execution entrypoint identifier and an execution user identifier, a combination thereof and the like. In an embodiment, the inspector 124 is configured to normalize the plurality of functionality records into a predefined data schema associated with the inspection environment 120. In an embodiment, the inspector 124 is configured to extract action identifier set and target identifier field set based on the functionality extraction configuration.

At S450, results of static inspection are stored in a security database. In an embodiment, the security database includes the graph database 126 storing the security graph. In an embodiment, the sensor backend server 128 is configured to store the results of static inspection by generating a node representing the resource, generating a node representing the software application, generating a plurality of nodes respectively representing the plurality of software functionalities, and generating edges associating the node representing the software application with the node representing the resource and with the plurality of nodes representing the plurality of software functionalities. In an embodiment, each such node includes the application identifier, the disk identifier, the timestamp, the functionality record, a combination thereof and the like. In an embodiment, the sensor backend server 128 is configured to store the results of static inspection by transmitting a write request to the graph database 126, the write request including the predefined data schema and the generated nodes and edges, and generating edges associating the node representing the software application with the plurality of nodes representing the plurality of software functionalities, a combination thereof and the like. In an embodiment, each node representing a software functionality includes the action identifier and the target identifier field.

Figure 5:
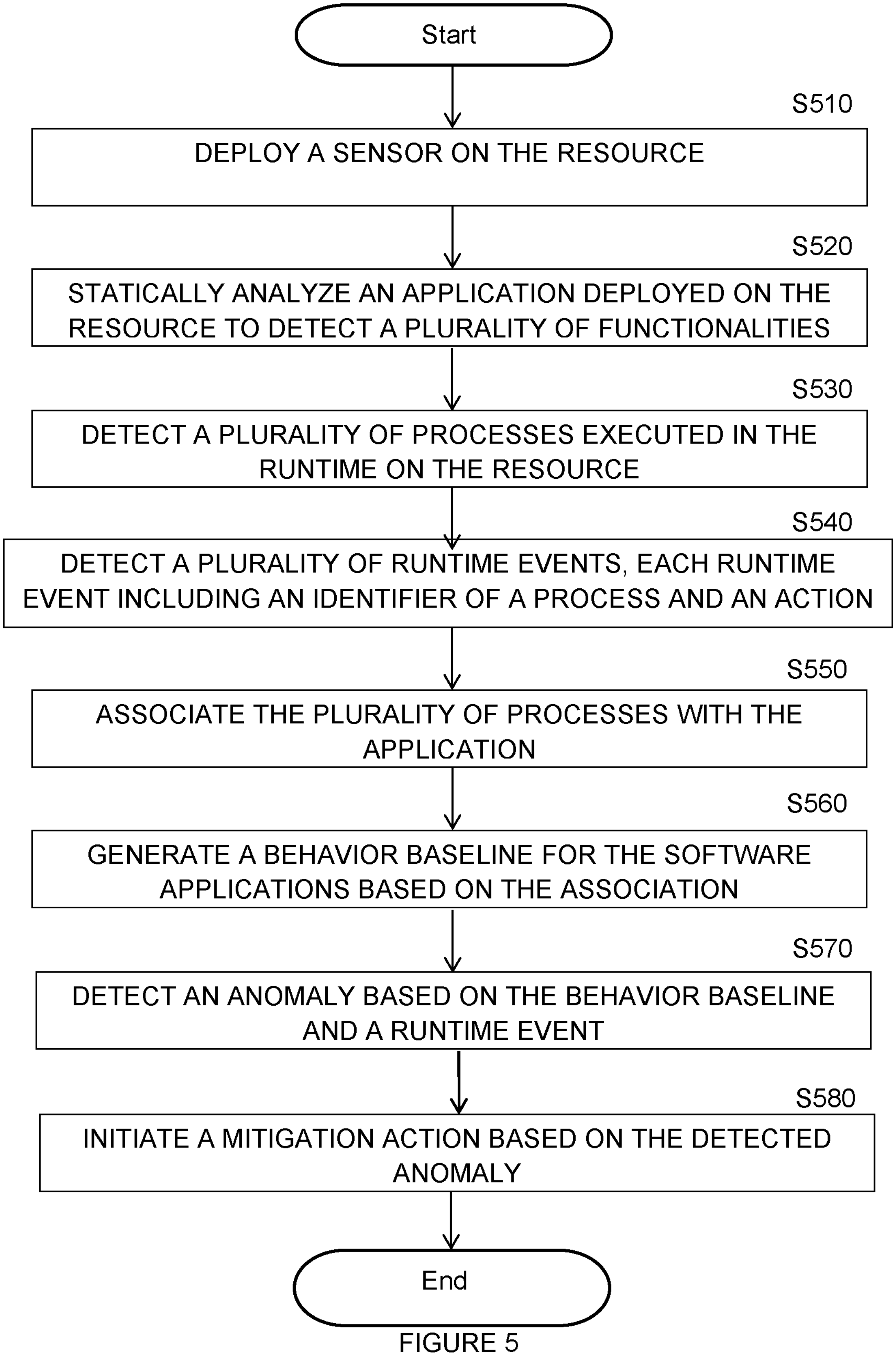
FIG. 5 is a flowchart of a method for associating runtime activity with a software application and initiating a mitigation action, implemented in accordance with an embodiment.

FIG. 5 is an example flowchart of a method for associating runtime activity with a software application and initiating a mitigation action, implemented in accordance with an embodiment.

At S510, a sensor is deployed on a resource. In an embodiment, the resource is deployed in the cloud computing environment 110 and includes any one of the virtual machine 112, the software container orchestrator 114, the serverless function 116, a combination thereof and the like. In an embodiment, deploying the sensor includes providing sensor software to the resource and executing the sensor software on the resource as a sensor 210, a daemonset pod 222, a sensor layer 238, a combination thereof and the like. In an embodiment, the sensor backend server 128 is configured to transmit the sensor software to the resource in response to receiving a resource identifier for the resource, and the resource is configured to execute the sensor software to instantiate the sensor on the resource. In certain embodiments, the sensor is configured to establish a communication session with the sensor backend server 128 using a transport layer protocol including TCP, and to transmit sensor generated data to the sensor backend server 128 through the communication session.

At S520, a software application deployed on the resource is statically inspected to detect a plurality of software functionalities. In an embodiment, the inspector 124 is configured to access an inspectable disk associated with the resource and to identify the software application and the plurality of software functionalities as described above with respect to FIG. 4. In an embodiment, the sensor backend server 128 is configured to receive, from the inspector 124, an application identifier and a plurality of functionality records respective of the plurality of software functionalities, and to store the application identifier and the plurality of functionality records in the graph database 126 as part of the security graph.

At S530, a plurality of processes executed in runtime on the resource are detected. In an embodiment, the sensor is configured to detect, through an eBPF interface, a plurality of process events, each process event including a process identifier, a parent process identifier, an executable path identifier, a user identifier, a group identifier, a capability identifier, a combination thereof and the like. In an embodiment, the sensor is configured to transmit the plurality of process events to the sensor backend server 128, and the sensor backend server 128 is configured to store the plurality of process events in the graph database 126, including storing a node representing a process and storing an edge associating the node representing the process with a node representing the resource.

At S540, a plurality of runtime events are detected, each runtime event including an identifier of a process and an action. In an embodiment, the sensor is configured to detect, through the eBPF interface, a system-call event including a call type identifier and call parameters, and to convert the system-call event into the runtime event. For example, the runtime event includes the process identifier, an action identifier indicating an open action, a read action, a write action, an execute action, a connect action, a bind action, a listen action, a chmod action, a chown action, a setuid action, a mount action, a combination thereof and the like, and a target identifier associated with the action. In an embodiment, the target identifier includes a file path identifier, a directory path identifier, a socket tuple identifier including an IP address identifier and a port identifier, a library path identifier, a combination thereof and the like. In an embodiment, the sensor is configured to enrich the runtime event by extracting file metadata from the resource, the file metadata including an ownership attribute, a permission attribute, a file type attribute, a last-modified timestamp, a combination thereof and the like, and by including the file metadata in the runtime event. In an embodiment, the sensor is configured to generate an event record for the runtime event, the event record including the process identifier and the action identifier, and the sensor is configured to transmit the event record to the sensor backend server 128.

At S550, the plurality of processes are associated with the software application based on matching the runtime events to the plurality of software functionalities. In an embodiment, the sensor backend server 128 is configured to obtain, from the graph database 126, the application identifier and the plurality of functionality records and to obtain, from the sensor generated data, the plurality of runtime events. In an embodiment, the sensor backend server 128 is configured to perform matching by applying a predefined matching function to a runtime event and a functionality record, the predefined matching function configured to compare an action identifier to a functionality field and to compare a target identifier to a functionality field. In an embodiment, matching the runtime events to the plurality of software functionalities includes mapping the action identifier in an event record to a functionality field of a functionality record generated from static inspection of the software application. For example, the predefined matching function compares a runtime event including a listen action and a port identifier to a functionality record including a listening port identifier, and outputs a match indicator indicating a match based on an equivalence of the port identifier. As another example, the predefined matching function compares a runtime event including a library path identifier to a functionality record including a library dependency identifier, and outputs the match indicator indicating the match based on a prefix match on the library path identifier. In an embodiment, the sensor backend server 128 is configured to assign an application construct identifier to a set of processes having runtime events that match the plurality of functionality records for the software application, and to store an association between the application construct identifier and the set of processes in the graph database 126 as part of the security graph.

In an embodiment, associating the plurality of processes with the software application further includes associating a stack trace record with a runtime event and utilizing the stack trace record to associate a process with the software application. In an embodiment, the sensor backend server 128 is configured to obtain, for a runtime event, a stack trace record including a plurality of frame identifiers and a process identifier, and obtain a symbolized stack trace record including a plurality of symbol identifiers generated based on the plurality of frame identifiers. In an embodiment, the sensor backend server 128 is configured to determine that a process belongs to the set of processes associated with the application construct identifier in response to determining that one or more symbol identifiers in the symbolized stack trace record satisfy an application stack trace criterion, the application stack trace criterion including a function identifier pattern, a module identifier pattern, a call sequence pattern, a call depth threshold, a combination thereof and the like.

At S560, a behavior baseline is generated for the software application based on events associated with the plurality of processes. In an embodiment, the sensor backend server 128 is further configured to generate a sensitive file set for the application construct identifier. In an embodiment, generating the sensitive file set includes identifying, from the runtime events associated with the set of processes, a first subset of runtime events having an action identifier indicating a read action, an execute action, a combination thereof and the like, and having a privilege attribute satisfying a predetermined privileged criterion, and selecting, from the first subset of runtime events, a plurality of file path identifiers as sensitive file identifiers. In an embodiment, the sensor backend server 128 is configured to store the sensitive file set in the graph database 126 by generating a plurality of nodes, each node of the plurality of nodes respectively representing the sensitive file identifiers, and associating the plurality of nodes with the node representing the application construct identifier and with the node representing the software application. In an embodiment, the sensor backend server 128 is configured to generate the behavior baseline by aggregating, for the set of processes associated with the application construct identifier, a plurality of baseline features extracted from the runtime events. For example, a baseline feature includes a set of file path identifiers accessed by the set of processes, a set of directory path identifiers written by the set of processes, a set of library path identifiers loaded by the set of processes, a set of destination IP address identifiers contacted by the set of processes, a set of listening port identifiers opened by the set of processes, a set of privilege attributes associated with the set of processes, a combination thereof and the like. In an embodiment, the sensor backend server 128 is configured to store the behavior baseline in the graph database 126 by generating a node representing the behavior baseline, associating the node representing the behavior baseline with the node representing the software application, and associating the node representing the behavior baseline with the node representing the application construct identifier. In an embodiment, the sensor backend server 128 is further configured to generate an application dependency set for the application construct identifier. In an embodiment, the application dependency set includes a set of file path identifiers, a set of directory path identifiers, a set of library path identifiers, a set of network endpoint identifiers, a set of inter-process communication identifiers, a combination thereof and the like, extracted from the runtime events associated with the set of processes. In an embodiment, the sensor backend server 128 is configured to store the application dependency set in the graph database 126 by associating a node representing the application dependency set with the node representing the application construct identifier and with the node representing the software application.

In an embodiment, the sensor backend server 128 is configured to generate a stack trace baseline for the software application by generating a plurality of stack trace signatures based on symbolized stack trace records associated with the application construct identifier and storing the plurality of stack trace signatures as baseline features associated with the application construct identifier. In an embodiment, the sensor backend server 128 is configured to store the plurality of stack trace signatures for a predetermined retention period. In an embodiment, the sensor backend server 128 is configured to compare a stack trace signature associated with a runtime event to the plurality of stack trace signatures stored for the predetermined retention period and output the anomaly indicator based on an output of the comparison. In an embodiment, a stack trace signature includes a normalized sequence of symbol identifiers, a normalized subsequence of symbol identifiers, a call depth indicator, a combination thereof and the like.

At S570, an anomaly is detected based on the behavior baseline and a runtime event. In an embodiment, the sensor backend server 128 is configured to evaluate a runtime event against the behavior baseline by computing a deviation score based on a comparison between a baseline feature and an event attribute. For example, the sensor backend server 128 is configured to compute the deviation score by comparing a file path identifier in the runtime event to the set of file path identifiers in the behavior baseline and outputting the deviation score indicating an unobserved file access when the file path identifier is absent from the set. As another example, the sensor backend server 128 is configured to compute the deviation score by comparing a privilege attribute of the process identifier in the runtime event to a privilege attribute distribution in the behavior baseline and outputting the deviation score indicating an anomalous privilege transition when the privilege attribute exceeds a predetermined privileged criterion. As another example, the sensor backend server 128 is configured to compute the deviation score by comparing an ownership attribute and a permission attribute included in the runtime event to a predetermined secure permission criterion and outputting the deviation score indicating a risky configuration when a privileged process accesses a file having a permission attribute that authorizes modification by a lower-privileged process. In an embodiment, the sensor backend server 128 is configured to apply a rule to the deviation score and to output an anomaly indicator indicating an anomalous event based on the rule evaluating to a true value. In an embodiment, the sensor backend server 128 is configured to generate an adjusted score for the anomalous event by obtaining, from the graph database 126, contextual attributes associated with the resource identifier, a principal identifier, a network segment identifier, a combination thereof and the like, and by applying a scoring function to the deviation score and the contextual attributes to generate the adjusted score, the adjusted score stored in the graph database 126 as part of an event record.

In an embodiment, the sensor backend server 128 is configured to detect a cybersecurity event based on the action identifier and the symbolized stack trace record. In an embodiment, detecting the cybersecurity event includes applying a rule to the event record, the rule including a first condition configured to evaluate the action identifier and a second condition configured to evaluate one or more symbol identifiers included in the symbolized stack trace record.

In an embodiment, the rule includes a stack trace definition, and the sensor backend server 128 is configured to evaluate the rule by comparing the one or more symbol identifiers to the stack trace definition. For example, the stack trace definition includes a function identifier pattern, a module identifier pattern, a call sequence pattern, a call depth threshold, a combination thereof and the like. For example, the first condition is configured to evaluate a process start operation, a network connect operation, a file operation, a combination thereof and the like, based on the action identifier. In an embodiment, the sensor backend server 128 is configured to apply a second rule to one or more symbol identifiers included in the symbolized stack trace record to output the anomaly indicator, wherein, in some embodiments, the second rule is the rule, and, in other embodiments, the rule and the second rule are different rules.

In an embodiment, the sensor backend server 128 is configured to generate a detection record responsive to outputting the anomaly indicator. In an embodiment, the detection record includes an application construct identifier, a process identifier, an action identifier, a stack trace record identifier, a symbolized stack trace record identifier, a deviation score, a timestamp, a combination thereof and the like. In an embodiment, the sensor backend server 128 is configured to store the detection record in the graph database 126 as part of the security graph by generating a node representing the detection record and generating edges associating the node representing the detection record with a node representing the resource and a node representing the software application.

At S580, a mitigation action is initiated based on the detected anomaly. In an embodiment, the sensor backend server 128 is configured to initiate the mitigation action by transmitting an instruction to the sensor deployed on the resource, the instruction identifying the process identifier and a mitigation operation. For example, the mitigation operation includes terminating the process corresponding to the process identifier, suspending the process corresponding to the process identifier, blocking a network connection associated with the process identifier, installing a host firewall rule on the resource to deny traffic to a destination IP address identifier, updating a Kubernetes® network policy associated with a pod to deny egress traffic for a destination IP address identifier and a port identifier, updating a web application firewall (WAF) policy to deny a uniform resource locator (URL) request associated with the runtime event, blocking access to a file path identifier associated with the runtime event, a combination thereof and the like. In an embodiment, the sensor backend server 128 is configured to initiate the mitigation action by generating an instruction for the inspection controller 122, the instruction identifying the resource and a cloud-level mitigation operation. For example, the cloud-level mitigation operation includes isolating the resource by modifying a security group rule, modifying a network access control list, initiating a quarantine virtual network segment, blocking an IP address identifier, a combination thereof and the like. In an embodiment, the sensor backend server 128 is configured to store, in the graph database 126, a mitigation record including the anomaly indicator, the deviation score, the process identifier, the application construct identifier, the mitigation operation, a timestamp, a combination thereof and the like.

Figure 6:
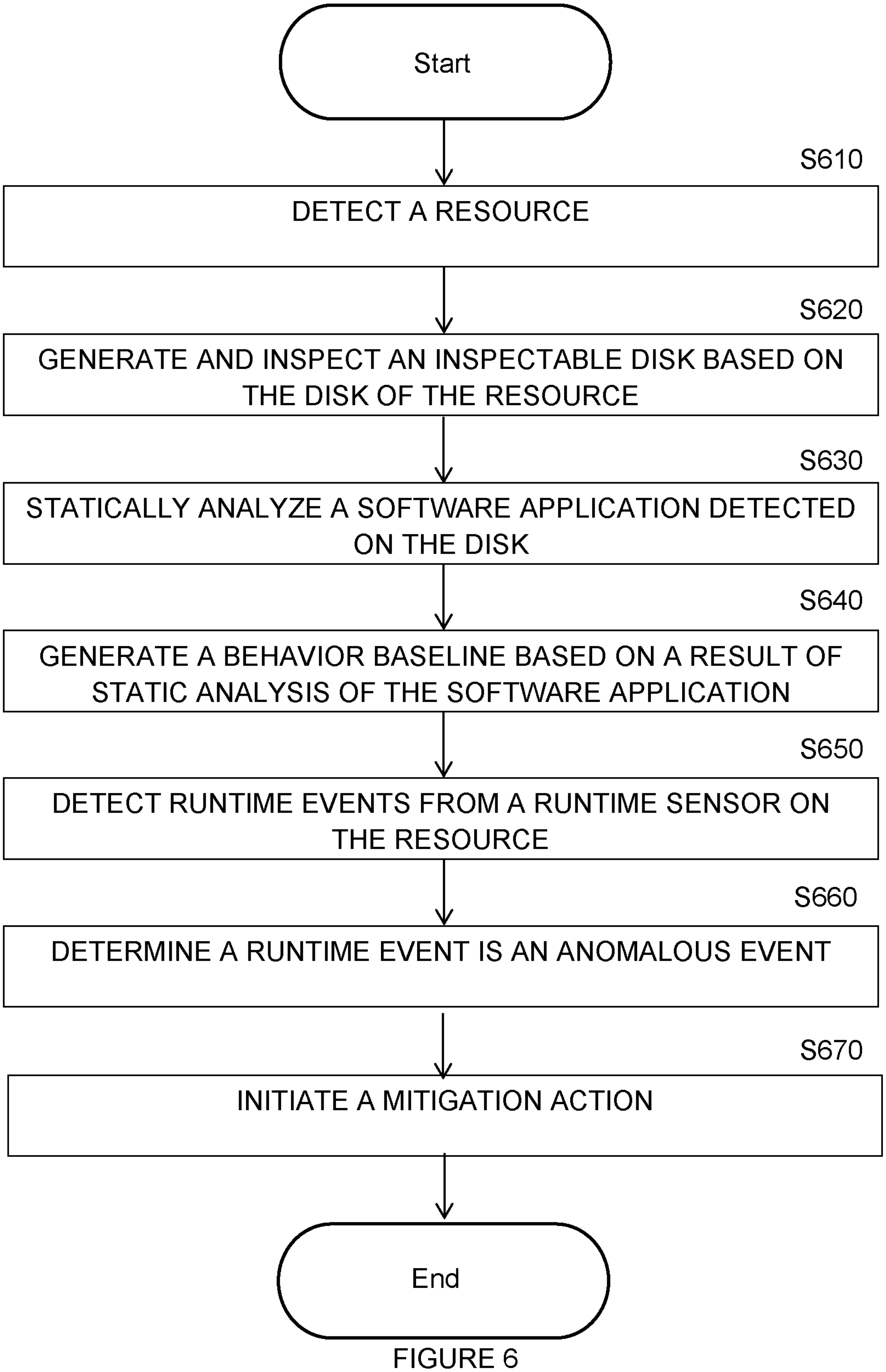
FIG. 6 is a flowchart of a method for performing runtime detection of an exploited application-specific misconfiguration and initiating a mitigation action, implemented in accordance with an embodiment.

FIG. 6 is an example flowchart of a method for performing runtime detection of an exploited application-specific misconfiguration and initiating a mitigation action, implemented in accordance with an embodiment.

At S610, a resource is detected, the resource including a disk associated with the resource. In an embodiment, the resource is deployed in the cloud computing environment 110 and includes any one of the virtual machine 112, the software container orchestrator 114, the serverless function 116, a combination thereof and the like. In an embodiment, the sensor backend server 128 is configured to obtain a resource identifier and a disk identifier for the disk by receiving sensor generated data from a sensor deployed on the resource, by receiving a message from a cloud control plane interface, by obtaining the resource identifier and the disk identifier from the security graph stored in the graph database 126, a combination thereof and the like.

At S620, an inspectable disk is generated and inspected based on the disk of the resource. In an embodiment, the inspection controller 122 is configured to generate the inspectable disk by initiating a snapshot operation, a copy operation, a clone operation, a combination thereof and the like, of the disk, and by exposing the inspectable disk as a storage object accessible in the inspection environment 120. In an embodiment, the inspection controller 122 is configured to provide access to the inspectable disk to the inspector 124 by attaching the inspectable disk to a workload in the inspection environment 120, by exposing the inspectable disk through a persistent volume claim (PVC), by mounting the inspectable disk into a file system namespace, a combination thereof and the like. In an embodiment, inspecting the inspectable disk includes reading file system metadata and file content blocks from the inspectable disk and generating inspection data describing such metadata and such content blocks.

At S630, a software application detected on the disk is statically inspected. In an embodiment, the inspector 124 is configured to detect the software application by identifying an application artifact on the inspectable disk, the application artifact including an executable file, a package manifest, an application configuration file, a container image descriptor, a service definition, a combination thereof and the like. In an embodiment, the inspector 124 is configured to generate an application identifier for the software application, the application identifier including an application name, a version identifier, a package identifier, a file path identifier, a cryptographic hash value, a combination thereof and the like.

At S640, a behavior baseline is generated based on a result of static inspection of the software application. In an embodiment, the inspector 124 is configured to generate a plurality of functionality records respective of the software application by extracting identifiers from the inspectable disk. For example, a functionality record includes a network endpoint identifier, a listening port identifier, a protocol identifier, a file path access pattern, a library dependency identifier, an execution entrypoint identifier, a configuration directive identifier, a privilege requirement indicator, a combination thereof and the like. In an embodiment, the sensor backend server 128 is configured to generate the behavior baseline by converting the plurality of functionality records into a plurality of baseline features, and by storing the plurality of baseline features as a baseline profile associated with the software application in the graph database 126. For example, the sensor backend server 128 is configured to generate a baseline feature including a set of expected listening port identifiers and a set of expected file path identifiers by selecting corresponding fields from the plurality of functionality records and normalizing such fields into a predefined data schema.

At S650, runtime events are detected from a runtime sensor on the resource. In an embodiment, the sensor is deployed on the resource as a sensor 210, a daemonset pod 222, a sensor layer 238, a combination thereof and the like. In an embodiment, the sensor is configured to detect, through an eBPF interface, a plurality of runtime events including a process identifier, an action identifier, and a target identifier. For example, the target identifier includes a file path identifier, a directory path identifier, a socket tuple identifier including an IP address identifier and a port identifier, a library path identifier, a combination thereof and the like. In an embodiment, the sensor is configured to enrich a runtime event by reading file metadata from the resource, the file metadata including an ownership attribute, a permission attribute, a file type attribute, a last-modified timestamp, a combination thereof and the like, and by including the file metadata in the runtime event. In an embodiment, the sensor is configured to transmit the plurality of runtime events to the sensor backend server 128.

At S660, a runtime event is evaluated and an anomalous event is identified. In an embodiment, the sensor backend server 128 is configured to obtain, from the graph database 126, the behavior baseline associated with the software application, and to obtain the runtime event from sensor generated data. In an embodiment, the sensor backend server 128 is configured to compute a deviation score for the runtime event by comparing an event attribute to a baseline feature. For example, the sensor backend server 128 is configured to compare a port identifier of a listen action in the runtime event to the set of expected listening port identifiers in the behavior baseline and to compute the deviation score indicating a mismatch when the port identifier is absent from the set. As another example, the sensor backend server 128 is configured to compare a file path identifier in a write action to the set of expected file path identifiers and to compute the deviation score indicating an unexpected write when the file path identifier fails to match a file path access pattern in the behavior baseline. As another example, the sensor backend server 128 is configured to compare a permission attribute of a file referenced by the runtime event to a predetermined secure permission criterion and to compute the deviation score indicating a risky configuration when the permission attribute authorizes modification by a lower-privileged process and the runtime event is associated with a privileged process. In an embodiment, the sensor backend server 128 is configured to apply a rule to the deviation score and to output an anomaly indicator indicating the anomalous event based on the rule evaluating to a true value. In an embodiment, computing the deviation score includes comparing a stack trace signature associated with the runtime event to the stack trace baseline associated with the software application.

At S670, a mitigation action is initiated. In an embodiment, the sensor backend server 128 is configured to initiate the mitigation action by transmitting an instruction to the sensor, the instruction identifying a process identifier associated with the anomalous event and a mitigation operation. For example, the mitigation operation includes terminating a process, suspending a process, blocking a network connection, blocking an IP address identifier, blocking access to a file path identifier, a combination thereof and the like. In an embodiment, the sensor backend server 128 is configured to initiate the mitigation action by generating an instruction for the inspection controller 122, the instruction identifying the resource and a cloud-level mitigation operation. For example, the cloud-level mitigation operation includes isolating the resource by modifying a security group rule, modifying a network access control list, initiating a quarantine virtual network segment, disabling credentials associated with a principal, a combination thereof and the like. In an embodiment, the sensor backend server 128 is configured to store a mitigation record in the graph database 126, the mitigation record including the anomaly indicator, the deviation score, the resource identifier, the process identifier, the mitigation operation, a timestamp, a combination thereof and the like.

Figure 7:
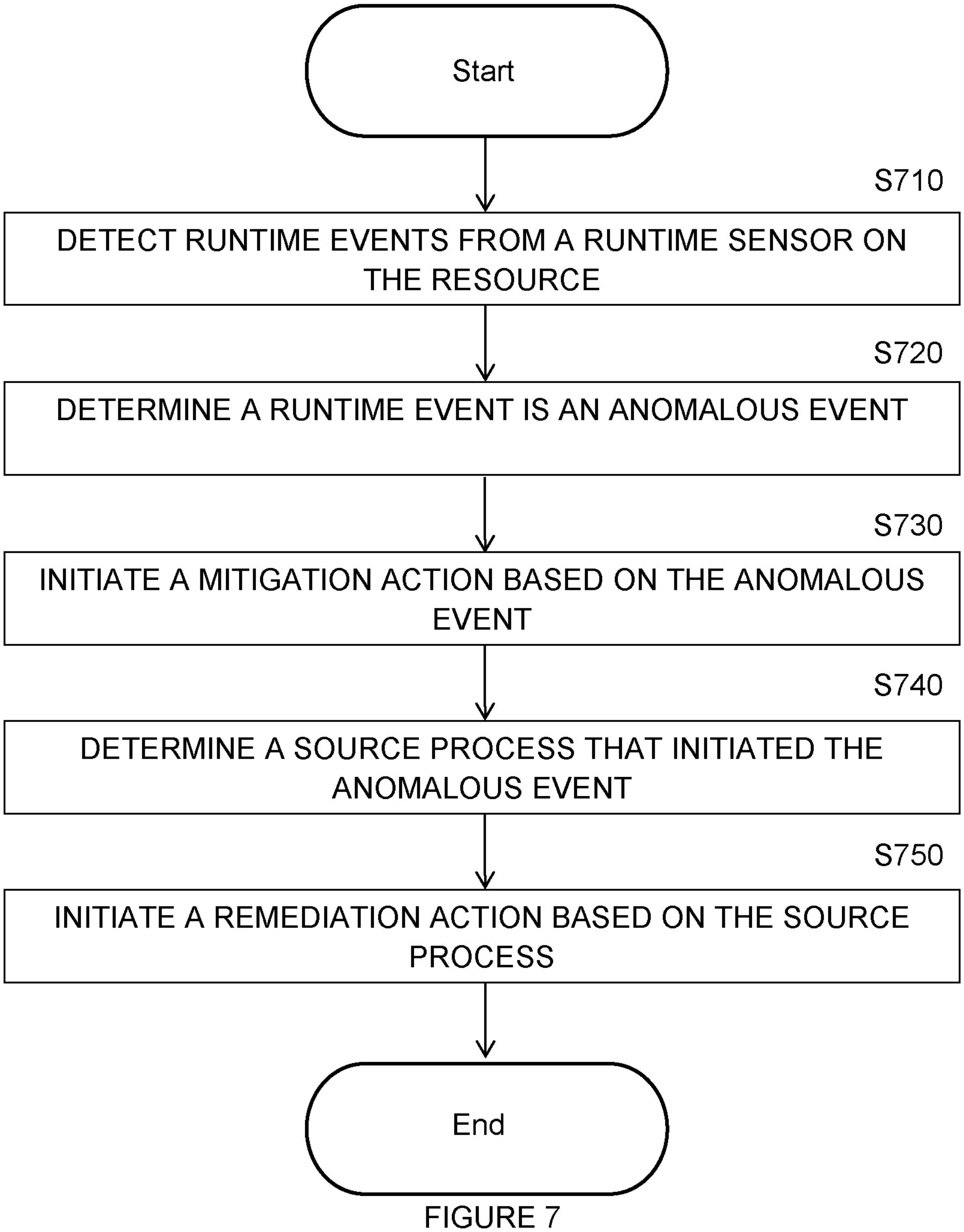
FIG. 7 is a flowchart of a method for initiating a mitigation action and a remediation action based on an anomalous runtime event, implemented in accordance with an embodiment.

FIG. 7 is an example flowchart of a method for initiating a mitigation action and a remediation action based on an anomalous runtime event, implemented in accordance with an embodiment.

At S710, runtime events are detected from a runtime sensor deployed on a resource. In an embodiment, the resource is deployed in the cloud computing environment 110 and includes any one of the virtual machine 112, the software container orchestrator 114, the serverless function 116, a combination thereof and the like. In an embodiment, the runtime sensor is implemented as the sensor 210, the daemonset pod 222, the sensor layer 238, a combination thereof and the like. In an embodiment, the sensor is configured to detect, through an eBPF interface, a runtime event including a process identifier, an action identifier, and a target identifier. For example, the target identifier includes a file path identifier, a directory path identifier, a socket tuple identifier including an IP address identifier and a port identifier, a library path identifier, a combination thereof and the like. In an embodiment, the sensor is configured to transmit the runtime event to the sensor backend server 128.

At S720, the runtime event is evaluated, and an anomalous event is identified. In an embodiment, the sensor backend server 128 is configured to obtain a behavior baseline associated with a software application and to evaluate the runtime event against the behavior baseline. In an embodiment, evaluating the runtime event includes computing a deviation score by comparing an event attribute to a baseline feature. For example, the sensor backend server 128 is configured to compute the deviation score indicating an unexpected file modification by comparing a file path identifier in a write action to a set of expected file path identifiers and file path access patterns represented in the behavior baseline. As another example, the sensor backend server 128 is configured to compute the deviation score indicating a privilege escalation attempt by comparing a privilege attribute associated with the process identifier to a predetermined privileged criterion and to a privilege attribute distribution represented in the behavior baseline. As another example, the sensor backend server 128 is configured to compute the deviation score indicating exploitation of a misconfiguration by comparing a permission attribute of a file referenced in the runtime event to a predetermined secure permission criterion and by identifying that the permission attribute authorizes modification by a lower-privileged process of a file relied upon by a privileged process. In an embodiment, the sensor backend server 128 is configured to apply a rule to the deviation score and to output an anomaly indicator indicating the anomalous event based on the rule evaluating to a true value. In an embodiment, the sensor backend server 128 is configured to identify exploitation of a misconfiguration based on a write action included in the runtime event and the sensitive file set associated with the application construct identifier, the identifying including comparing a file path identifier of the write action to the sensitive file identifiers and identifying a match based on the file path identifier matching a sensitive file identifier. In an embodiment, the sensor backend server 128 is configured to generate an adjusted score for the anomalous event by obtaining contextual attributes from the security graph stored in the graph database 126 and applying a scoring function to the deviation score and the contextual attributes to generate the adjusted score.

At S730, a mitigation action is initiated based on the anomalous event. In an embodiment, the sensor backend server 128 is configured to initiate the mitigation action by transmitting an instruction to the sensor deployed on the resource, the instruction identifying the process identifier and a mitigation operation. For example, the mitigation operation includes installing a host firewall rule to deny traffic for the socket tuple identifier, updating a Kubernetes® network policy to deny egress for the destination IP address identifier and the port identifier, updating a web application firewall (WAF) policy to deny a uniform resource locator (URL) request associated with the anomalous event, terminating a process corresponding to the process identifier, suspending the process corresponding to the process identifier, blocking a network connection associated with the process identifier, blocking access to a file path identifier associated with the anomalous event, a combination thereof and the like. In an embodiment, the sensor backend server 128 is configured to initiate the mitigation action by generating an instruction for the inspection controller 122, the instruction identifying the resource and a cloud-level mitigation operation. For example, the cloud-level mitigation operation includes isolating the resource by modifying a security group rule, modifying a network access control list, initiating a quarantine virtual network segment, disabling credentials associated with a principal represented in the security graph stored in the graph database 126, a combination thereof and the like. In an embodiment, the sensor backend server 128 is configured to store, in the graph database 126, a mitigation record including the anomaly indicator, the deviation score, the process identifier, the resource identifier, and the mitigation operation. In an embodiment, the sensor backend server 128 is configured to generate an incident identifier for the anomalous event and to store, in the graph database 126, an incident record associated with the incident identifier, the incident record including the anomaly indicator, the adjusted score, the mitigation record, a timestamp, a combination thereof and the like.

At S740, a source process that initiated the anomalous event is identified. In an embodiment, the sensor backend server 128 is configured to identify the source process by correlating runtime events in a predetermined time window with the anomalous event. For example, the sensor backend server 128 is configured to identify the source process by obtaining, from sensor generated data, a parent process identifier associated with the process identifier of the anomalous event and by traversing a process lineage including the parent process identifier to identify an originating process. In an embodiment, the sensor backend server 128 is configured to identify the source process by obtaining a plurality of runtime events including an execute action and an inter-process communication action, and by correlating the plurality of runtime events based on a shared process identifier, a shared file path identifier, a shared socket tuple identifier, a combination thereof and the like. In some embodiments, sensor backend server 128 is configured to identify the source process by correlating a plurality of runtime events based on a shared dependency identifier represented in the application dependency set, the shared dependency identifier including a file path identifier, a library path identifier, a socket tuple identifier, a combination thereof and the like. In an embodiment, the source process is represented by a source process identifier, and the sensor backend server 128 is configured to store an association between the source process identifier and the mitigation record in the graph database 126.

At S750, a remediation action is initiated based on the source process. In an embodiment, the sensor backend server 128 is configured to identify a remediation category based on attributes of the source process identifier and attributes of the anomalous event. For example, the sensor backend server 128 is configured to identify the remediation category including a permission remediation category, an ownership remediation category, a configuration remediation category, a credential remediation category, a code remediation category, a dependency remediation category, a combination thereof and the like, by comparing the anomalous event to a plurality of remediation rules stored in the graph database 126. In an embodiment, the sensor backend server 128 is configured to initiate the remediation action by generating an instruction for the inspection controller 122, the instruction identifying the resource, the remediation category, and a remediation operation. For example, the remediation operation includes modifying a permission attribute for a file path identifier to remove write authorization for a lower-privileged process, modifying an ownership attribute for the file path identifier to assign ownership to a predetermined owner, modifying a configuration directive of the software application, rotating credentials associated with a principal, blocking a dependency artifact identified by a cryptographic hash value, a combination thereof and the like. In certain embodiments, the remediation operation further includes deploying a corrected code object to the resource, the corrected code object including corrected application code, corrected function code 232, corrected code layers 234 through 236, a combination thereof and the like. In certain embodiments, the remediation operation further includes removing sensitive data from a code object associated with the software application to generate a sanitized code object, the sensitive data including a credential, an application programming interface key, a secret token, a private key, a certificate, a combination thereof and the like. In certain embodiments, the remediation operation further includes storing the sanitized code object in a repository associated with the cloud computing environment 110 and redeploying the software application using the sanitized code object by updating an execution configuration of the software application to reference the sanitized code object. In an embodiment, the sensor backend server 128 is configured to store, in the graph database 126, a remediation record including the source process identifier, the remediation category, the remediation operation, a timestamp, a combination thereof and the like. In an embodiment, the sensor backend server 128 is configured to associate the remediation record with the incident identifier by generating an edge in the security graph between a node representing the remediation record and a node representing the incident record. In some embodiments, the sensor backend server 128 is configured to select the remediation operation based on the application dependency set associated with the application construct identifier, the selecting including identifying a dependency identifier implicated by the anomalous event and selecting a remediation operation configured to modify access to the dependency identifier, update a configuration directive referencing the dependency identifier, a combination thereof and the like.

Figure 8:
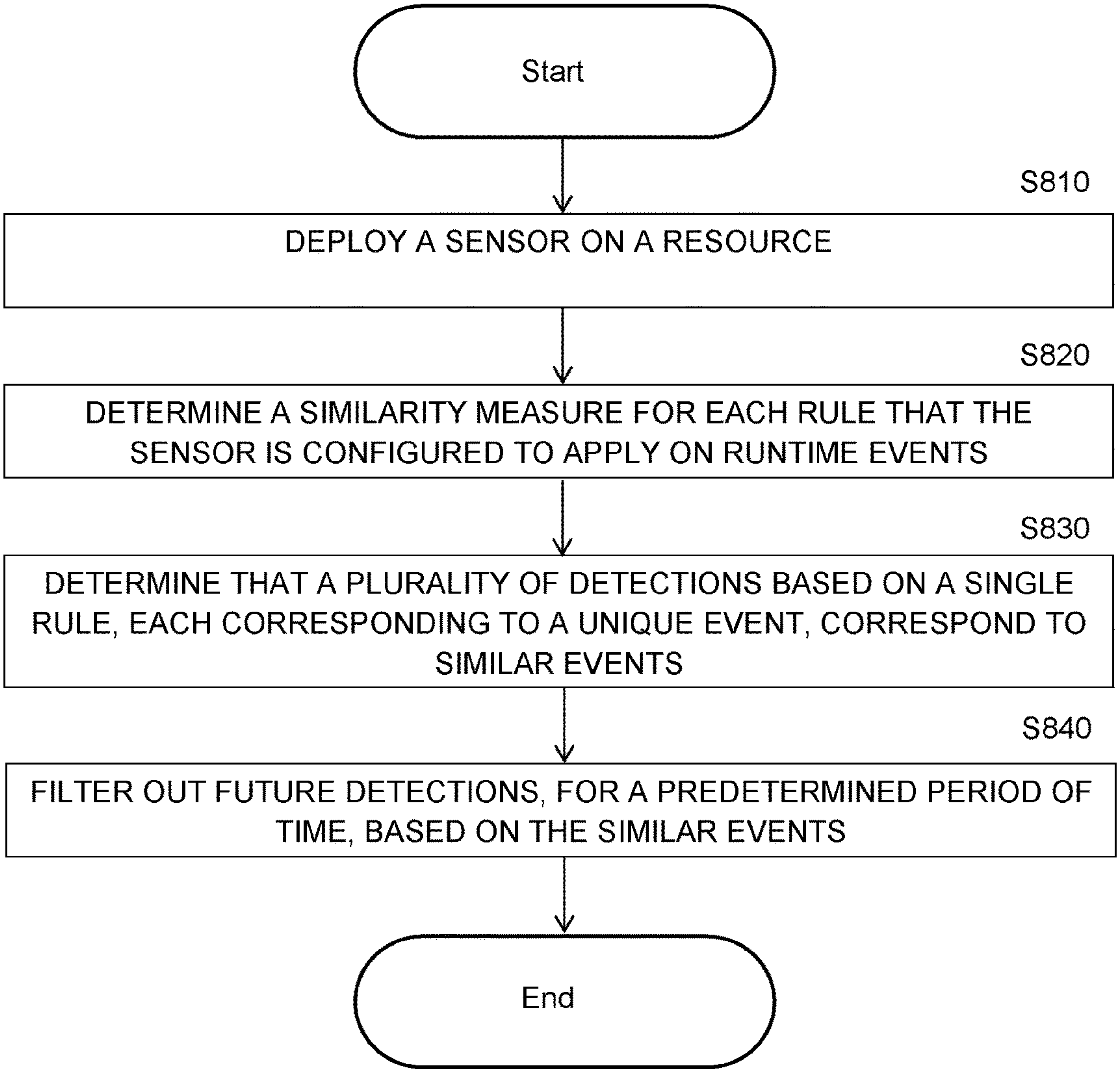
FIG. 8 is a flowchart of a method for noise reduction in cybersecurity detections based on runtime events detected in a cloud computing environment, implemented in accordance with an embodiment.

FIG. 8 is an example flowchart of a method for noise reduction in cybersecurity detections based on runtime events detected in a cloud computing environment, implemented in accordance with an embodiment.

At S810, a sensor is deployed on a resource. In an embodiment, the resource is deployed in the cloud computing environment 110 and includes any one of the virtual machine 112, the software container orchestrator 114, the serverless function 116, a combination thereof and the like. In an embodiment, deploying the sensor includes providing sensor software to the resource and executing the sensor software on the resource as the sensor 210, the daemonset pod 222, the sensor layer 238, a combination thereof and the like. In an embodiment, the sensor is configured to detect runtime events through an eBPF interface and to generate sensor generated data, including the runtime events. In an embodiment, the sensor is configured to apply a plurality of rules to the runtime events, each rule including a logical expression and an action that includes generating a detection. In an embodiment, the sensor is configured to transmit the detection to the sensor backend server 128 through a communication session established using a transport layer protocol, including TCP.

At S820, a similarity measure is determined for each rule of the plurality of rules which the sensor is configured to apply on runtime events. In an embodiment, the sensor backend server 128 is configured to determine the similarity measure for a rule by selecting a plurality of rule features from the sensor generated data, and by generating a similarity function configured to compute a similarity score between a first runtime event and a second runtime event based on the plurality of rule features. For example, the plurality of rule features include an action identifier, a target identifier, a process identifier attribute including an executable path identifier, a resource identifier, a principal identifier associated with the resource in the security graph stored in the graph database 126, a destination IP address identifier, a destination port identifier, a file path identifier, an ownership attribute, a permission attribute, a combination thereof and the like. In an embodiment, the similarity function is configured to compute the similarity score by applying an equivalence comparison to a subset of the plurality of rule features and applying a prefix match comparison to another subset of the plurality of rule features, and by combining results of the equivalence comparison and the prefix match comparison into the similarity score. In an embodiment, determining the similarity measure for the rule includes storing, in the graph database 126, a rule record including a rule identifier and the plurality of rule features used by the similarity function. In certain embodiments, the plurality of rule features further includes a stack trace signature derived from a symbolized stack trace record, the stack trace signature including a normalized sequence of symbol identifiers, a normalized subsequence of symbol identifiers, a combination thereof and the like.

At S830, a plurality of detections based on a single rule are detected in a first time frame, each detection corresponding to a unique runtime event, and the plurality of runtime events are determined to correspond to similar events. In an embodiment, the sensor backend server 128 is configured to receive, from the sensor, the plurality of detections, each detection including the rule identifier and an event record corresponding to the unique runtime event. In an embodiment, the sensor backend server 128 is configured to group the plurality of detections into a detection group associated with the rule identifier and the first time frame by comparing event records using the similarity function for the rule identifier. In an embodiment, the sensor backend server 128 is configured to compute a similarity score for a pair of event records and to determine that the pair of event records corresponds to similar events in response to the similarity score satisfying a similarity threshold for the rule identifier. In an embodiment, the sensor backend server 128 is configured to determine that the plurality of runtime events are similar by determining that a predetermined number of event records in the detection group satisfy the similarity threshold relative to a representative event record in the detection group. In an embodiment, the sensor backend server 128 is configured to store the detection group in the graph database 126, the detection group including the rule identifier, the first time frame, the representative event record, and a group count indicating the predetermined number. In an embodiment, the sensor backend server 128 is configured to generate a user interface record for a detection, the user interface record including one or more symbol identifiers of a symbolized stack trace record associated with the detection and one or more event attributes of an event record associated with the detection, the user interface record stored in the graph database 126 and transmitted for presentation.

At S840, future detections are filtered out for a predetermined period of time in response to determining that the plurality of runtime events are similar. In an embodiment, the sensor backend server 128 is configured to generate a suppression instruction identifying the rule identifier, the representative event record, the similarity threshold, and a suppression duration corresponding to the predetermined period of time. In an embodiment, the sensor backend server 128 is configured to transmit the suppression instruction to the sensor, and the sensor is configured to store a suppression entry based on the suppression instruction. In an embodiment, the sensor is configured to evaluate a next runtime event detected after the first time frame by computing, for the next runtime event, a next event record and by computing a next similarity score between the next event record and the representative event record using the similarity function for the rule identifier. In an embodiment, the sensor is configured to filter a next detection generated after the first time frame in response to the next similarity score satisfying the similarity threshold and in response to determining that a suppression duration for the suppression entry has not elapsed. In an embodiment, filtering the next detection includes suppressing transmission of the next detection to the sensor backend server 128 while storing, on the resource, a suppression log record including the rule identifier, the next event record, and a timestamp. In certain embodiments, the sensor is configured to transmit, to the sensor backend server 128, a suppression summary including the group count and a count of filtered detections after the first time frame, the suppression summary transmitted after the suppression duration has elapsed.

In certain embodiments, the sensor backend server 128 is configured to perform inline event suppression based on a similarity measure. In an embodiment, the sensor backend server 128 is configured to receive a runtime event from a sensor and generate a similarity key for the runtime event, the similarity key including one or more event attributes selected according to a rule, the one or more event attributes including a resource identifier, an application identifier, an application construct identifier, a process identifier, an action identifier, a target identifier, a destination IP address identifier, a port identifier, a timestamp bucket identifier, a combination thereof and the like. In an embodiment, the sensor backend server 128 is configured to generate the similarity key by normalizing the one or more event attributes into a predefined data schema and hashing the normalized one or more event attributes to produce the similarity key.

In some embodiments, the sensor backend server 128 is configured to maintain, for each similarity key, an event counter and a suppression state. In an embodiment, the sensor backend server 128 is configured to compare the event counter to a threshold value specified by the rule, and to transmit a detection alert for a first event associated with the similarity key and for a predetermined number of subsequent events associated with the similarity key while the event counter is less than the threshold value. In an embodiment, in response to the event counter satisfying the threshold value, the sensor backend server 128 is configured to suppress transmission of subsequent detection alerts for subsequent events associated with the similarity key while continuing to store, in the graph database 126, an event record including the similarity key, the event counter, a representative event attribute set, a timestamp, a combination thereof and the like.

In some embodiments, the sensor backend server 128 is configured to terminate suppression for the similarity key based on a suppression termination criterion. For example, the suppression termination criterion includes an elapsed time exceeding a time window, a change in an event attribute included in the similarity key, a mitigation action being initiated for the resource identifier, a remediation record being stored for the application identifier, a combination thereof and the like. In an embodiment, in response to the suppression termination criterion being satisfied, the sensor backend server 128 is configured to reset the event counter and the suppression state for the similarity key.

In some embodiments, the sensor backend server 128 is configured to generate a trigger group identifier for event enrichment. In an embodiment, the sensor backend server 128 is configured to generate the trigger group identifier based on a rule-defined grouping function applied to a plurality of event attributes, the plurality of event attributes including an application identifier, an application construct identifier, an action identifier, a target identifier, a destination IP address identifier, a port identifier, a privilege attribute, a combination thereof and the like. In an embodiment, the sensor backend server 128 is configured to associate a runtime event with a trigger group identifier by storing, in the graph database 126, an edge between an event record node representing the runtime event and a trigger group node representing the trigger group identifier.

In an embodiment, the sensor backend server 128 is configured to generate a variant identifier for the runtime event based on a variant selection criterion. For example, the variant selection criterion includes a cloud platform identifier, a resource type identifier, an execution environment identifier, a principal type identifier, a network segment identifier, a privilege attribute, a combination thereof and the like. In an embodiment, the sensor backend server 128 is configured to apply a variant scoring adjustment to the adjusted score by obtaining a variant adjustment value associated with the variant identifier and combining the variant adjustment value with the adjusted score to generate a final score, the final score stored in the graph database 126 and transmitted as part of a detection alert.

In some embodiments, the sensor backend server 128 is configured to manage an application detection and response workflow for an incident record stored in the graph database 126. In an embodiment, the sensor backend server 128 is configured to assign a workflow state to the incident record, the workflow state including a detected state, a mitigated state, a remediated state, a closed state, a combination thereof and the like, and to update the workflow state by storing, in the graph database 126, a state transition record including a prior state identifier, a subsequent state identifier, a transition timestamp, a transition reason identifier, a combination thereof and the like.

In some embodiments, the sensor backend server 128 is configured to update the workflow state based on stored records. For example, the sensor backend server 128 is configured to update the workflow state from the detected state to the mitigated state in response to storing the mitigation record, and to update the workflow state from the mitigated state to the remediated state in response to storing the remediation record.

Figure 9:
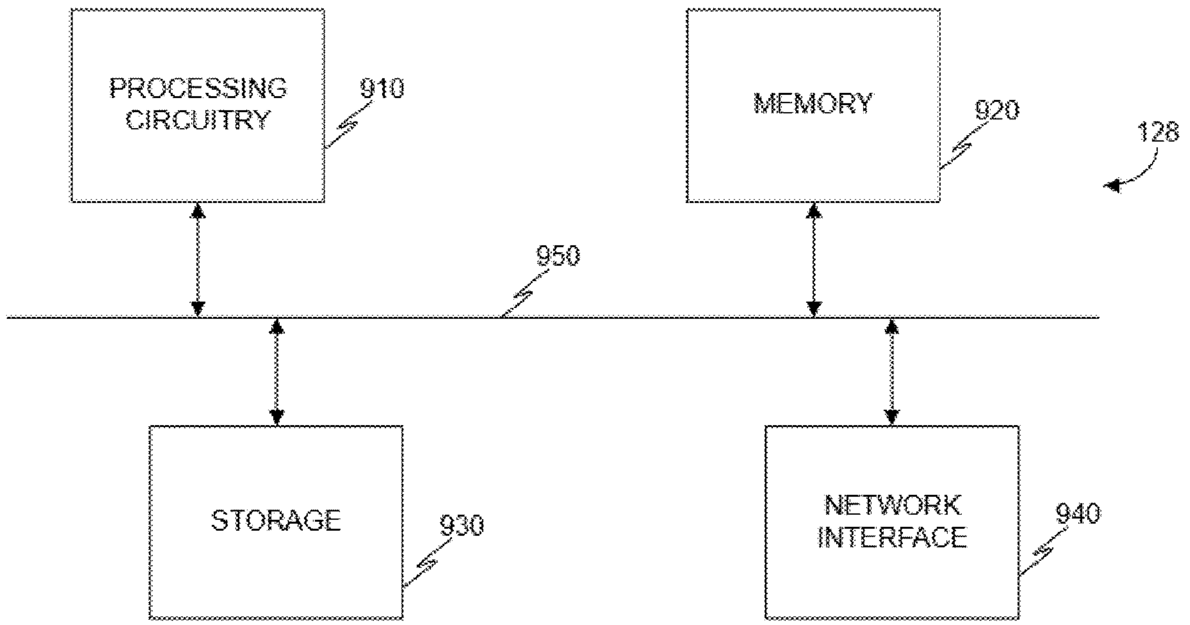
FIG. 9 is a schematic diagram of a sensor backend server according to an embodiment.

FIG. 9 is an example schematic diagram of a sensor backend server 128 according to an embodiment. The sensor backend server 128 includes a processing circuitry 910 coupled to a memory 920, a storage 930, and a network interface 940. In an embodiment, the components of the sensor backend server 128 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 940 allows the sensor backend server 128 to communicate with, for example, a sensor 210, a daemonset pod 222, a sensor layer 238, and the like.

It should be understood that the embodiments described herein are not limited to the specific architecture illustrated in FIG. 9, and other architectures may be equally used without departing from the scope of the disclosed embodiments.

Furthermore, in certain embodiments the inspection controller 122, inspector 124, and the like, may be implemented with the architecture illustrated in FIG. 9. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for discovering application components and processes for application detection and response, comprising:

deploying a runtime sensor on a resource, the resource deployed in a cloud computing environment;

configuring the runtime sensor to detect a plurality of processes executed in real time on the resource;

associating the plurality of processes with a single application installed on the resource based on a user space stack trace;

configuring the runtime sensor to detect a cybersecurity event based on an action performed by a process of the plurality of processes;

receiving a detection from the runtime sensor indicating the cybersecurity event; and initiating a mitigation action based on the received detection.

2. The method of claim 1, further comprising:

monitoring a data link layer communication through an extended Berkeley Packet Filter (eBPF) interface; and detecting the plurality of processes based on the monitoring.

3. The method of claim 1, further comprising:

statically inspecting an inspectable disk associated with the resource; and identifying the single application based on the static inspection.

4. The method of claim 1, further comprising:

statically inspecting the single application; and generating a plurality of functionality records based on a static inspection of the single application.

5. The method of claim 4, wherein each functionality record among the plurality of functionality records includes a first action identifier and a target identifier field, further comprising:

identifying a second action identifier included in a runtime event;

comparing the first action identifier with the second action identifier;

matching a runtime event to a functionality record among the plurality of functionality records based on the comparison; and determining a process among the plurality of processes corresponds to the single application based on the matched runtime event.

6. The method of claim 5, further comprising:

converting the action identifier and the target identifier field of the plurality of functionality records into a set of baseline features; and generating a behavior baseline for the single application based on the set of baseline features.

7. The method of claim 1, further comprising:

generating an instruction identifying a process identifier associated with the received detection; and transmitting the instruction to the runtime sensor to terminate a process corresponding to the process identifier.

8. The method of claim 1, further comprising:

capturing the user space stack trace associated with the action performed by the process, the user space stack trace including a plurality of frame identifiers;

obtaining a memory snapshot of an address space associated with the process;

parsing the memory snapshot to obtain symbol data;

resolving the plurality of frame identifiers based on the symbol data; and generating a symbolized stack trace record including a plurality of symbol identifiers based on the resolved plurality of frame identifiers.

9. The method of claim 8, further comprising:

applying a rule to the action and to one or more symbol identifiers among the plurality of symbol identifiers, wherein detecting the cybersecurity event further includes the applied rule.

10. A non-transitory computer-readable medium storing a set of instructions for discovering application components and processes for application detection and response, the set of instructions comprising:

one or more instructions that, when executed by one or more processing circuitries of a device, cause the device to:

deploy a runtime sensor on a resource, the resource deployed in a cloud computing environment;

configure the runtime sensor to detect a plurality of processes executed in real time on the resource;

associate the plurality of processes with a single application installed on the resource based on a user space stack trace;

configure the runtime sensor to detect a cybersecurity event based on an action performed by a process of the plurality of processes;

receive a detection from the runtime sensor indicating the cybersecurity event; and initiate a mitigation action based on the received detection.

11. A system for discovering application components and processes for application detection and response comprising:

a processing circuitry;

a memory, the memory containing instructions that, when executed by the processing circuitry, configure the system to:

deploy a runtime sensor on a resource, the resource deployed in a cloud computing environment;

configure the runtime sensor to detect a plurality of processes executed in real time on the resource;

associate the plurality of processes with a single application installed on the resource based on a user space stack trace;

configure the runtime sensor to detect a cybersecurity event based on an action performed by a process of the plurality of processes;

receive a detection from the runtime sensor indicating the cybersecurity event; and initiate a mitigation action based on the received detection.

12. The system of claim 11, wherein the memory contains further instructions which when executed by the processing circuitry further configure the system to:

monitor a data link layer communication through an extended Berkeley Packet Filter (eBPF) interface; and detect the plurality of processes based on the monitoring.

13. The system of claim 11, wherein the memory contains further instructions which when executed by the processing circuitry further configure the system to:

statically inspect an inspectable disk associated with the resource; and identify the single application based on the static inspection.

14. The system of claim 11, wherein the memory contains further instructions which when executed by the processing circuitry further configure the system to:

statically inspect the single application; and generate a plurality of functionality records based on a static inspection of the single application.

15. The system of claim 14, wherein each functionality record among the plurality of functionality records includes a first action identifier and a target identifier field, further comprising:

identify a second action identifier included in a runtime event;

compare the first action identifier with the second action identifier;

match a runtime event to a functionality record among the plurality of functionality records based on the comparison; and determine a process among the plurality of processes corresponds to the single application based on the matched runtime event.

16. The system of claim 15, wherein the memory contains further instructions which when executed by the processing circuitry further configure the system to:

convert the action identifier and the target identifier field of the plurality of functionality records into a set of baseline features; and generate a behavior baseline for the single application based on the set of baseline features.

17. The system of claim 11, wherein the memory contains further instructions which when executed by the processing circuitry further configure the system to:

generate an instruction identifying a process identifier associated with the received detection; and transmit the instruction to the runtime sensor to terminate a process corresponding to the process identifier.

18. The system of claim 11, wherein the memory contains further instructions which when executed by the processing circuitry further configure the system to:

capture the user space stack trace associated with the action performed by the process, the user space stack trace including a plurality of frame identifiers;

obtain a memory snapshot of an address space associated with the process;

parse the memory snapshot to obtain symbol data;

resolve the plurality of frame identifiers based on the symbol data; and generate a symbolized stack trace record including a plurality of symbol identifiers based on the resolved plurality of frame identifiers.

19. The system of claim 18, wherein the memory contains further instructions which when executed by the processing circuitry further configure the system to:

apply a rule to the action and to one or more symbol identifiers among the plurality of symbol identifiers, wherein detecting the cybersecurity event further includes the applied rule.

* * * * *